United States Patent
Randolph et al.

(10) Patent No.: US 9,148,237 B2
(45) Date of Patent: *Sep. 29, 2015

(54) DIGITAL TELEVISION CHANNEL TRENDING

(75) Inventors: Donald Lewis Randolph, Lenexa, KS (US); Bradley C. Griner, Kansas City, MO (US); Jeffrey Walter Zimmerman, Lenexa, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,395

(22) Filed: Aug. 23, 2012

(65) Prior Publication Data

US 2012/0331497 A1  Dec. 27, 2012

Related U.S. Application Data

(63) Continuation of application No. 12/146,330, filed on Jun. 25, 2008, now Pat. No. 8,266,644.

(51) Int. Cl.
  *H04N 7/16* (2011.01)
  *H04H 60/37* (2008.01)
  *H04N 7/173* (2011.01)
  *H04N 21/218* (2011.01)
  *H04N 21/2183* (2011.01)
  *H04N 21/222* (2011.01)
  *H04N 21/25* (2011.01)
  *H04N 21/258* (2011.01)
  *H04N 21/44* (2011.01)
  *H04N 21/466* (2011.01)
  *H04N 21/472* (2011.01)
  *H04N 21/475* (2011.01)

(Continued)

(52) U.S. Cl.
  CPC ......... *H04H 60/372* (2013.01); *H04N 7/17318* (2013.01); *H04N 21/2183* (2013.01); *H04N 21/21815* (2013.01); *H04N 21/2221* (2013.01); *H04N 21/252* (2013.01); *H04N 21/25883* (2013.01); *H04N 21/44016* (2013.01); *H04N 21/4667* (2013.01); *H04N 21/4756* (2013.01); *H04N 21/47202* (2013.01); *H04N 21/6582* (2013.01); *H04N 21/812* (2013.01)

(58) Field of Classification Search
  CPC .................. H04N 21/25808; H04N 21/44222; H04N 60/43
  See application file for complete search history.

(56) References Cited

U.S. PATENT DOCUMENTS

| | | | |
|---|---|---|---|
| 6,381,746 B1 * | 4/2002 | Urry | 725/87 |
| 2004/0088729 A1 | 5/2004 | Petrovic et al. | |
| 2004/0133914 A1 * | 7/2004 | Smith et al. | 725/86 |

(Continued)

*Primary Examiner* — Jefferey Harold
*Assistant Examiner* — Samira Monshi
(74) *Attorney, Agent, or Firm* — Jackson Walker L.L.P.

(57) ABSTRACT

Channel trending, including determining a number of viewers watching a multimedia program, is achieved in a digital television network. Cached multimedia frames that correspond to portions of the multimedia program are maintained, for example, on a device located on an edge (i.e., in a network edge device) of the digital television network. In response to a request from a client device (e.g., a set-top box) to receive the multimedia program, cached multimedia frames are fed from the edge device to the client device. Upon a seamless transfer or handoff resulting in a simulcast replicator or multicast replicator providing further portions of the multimedia program, a signal (e.g., a simple network management protocol TRAP statement) is sent to a viewership statistic server for incrementing a counter.

20 Claims, 4 Drawing Sheets

(51) Int. Cl.
*H04N 21/658* (2011.01)
*H04N 21/81* (2011.01)

(56) References Cited

U.S. PATENT DOCUMENTS

| | | |
|---|---|---|
| 2004/0216041 A1 | 10/2004 | Ajizadeh |
| 2005/0060738 A1 | 3/2005 | Stecyk |
| 2005/0060740 A1 | 3/2005 | Stecyk |
| 2005/0120377 A1* | 6/2005 | Carlucci et al. ............... 725/90 |
| 2005/0210530 A1* | 9/2005 | Horvitz et al. ............... 725/134 |
| 2006/0218574 A1 | 9/2006 | Van Horck |
| 2007/0136753 A1 | 6/2007 | Bovenschulte et al. |
| 2007/0157221 A1 | 7/2007 | Ou et al. |
| 2007/0250901 A1* | 10/2007 | McIntire et al. ............... 725/146 |
| 2007/0266395 A1* | 11/2007 | Lee et al. ............... 725/11 |
| 2009/0025027 A1* | 1/2009 | Craner ............... 725/32 |
| 2009/0265743 A1* | 10/2009 | Gao ............... 725/94 |

\* cited by examiner

DIGITAL TELEVISION CHANNEL TRENDING

The present patent application is a continuation of U.S. patent application Ser. No. 12/146,330, filed Jun. 25, 2008, the entirety of which is hereby incorporated by reference.

BACKGROUND

1. Field of the Disclosure

The present disclosure generally relates to multimedia provider networks and more particularly to systems and methods for performing digital television channel trending in digital television networks.

2. Description of the Related Art

Provider networks provide multimedia content such as digital television programs to viewers. It can be useful to advertisers and television executives, as examples, to have data related to how many viewers are tuned to a particular television program. Collecting the data can be burdensome if a viewer is responsible for manually providing data regarding received content.

DESCRIPTION OF THE EMBODIMENT(S)

Figure 1:
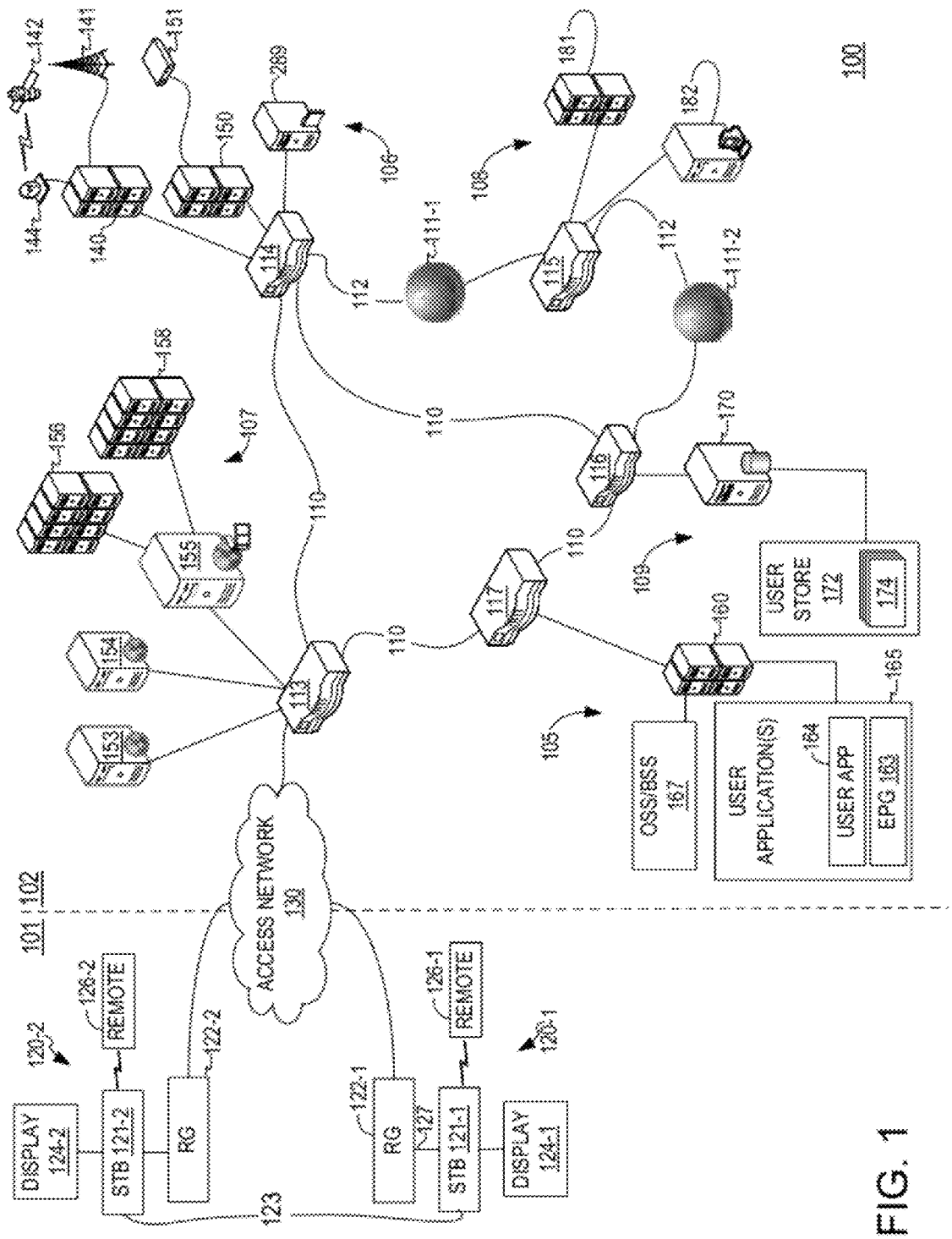
FIG. 1 illustrates a representative Internet Protocol Television (IPTV) system for performing digital television channel trending in accordance with disclosed embodiments.

In one aspect, a disclosed method tracks a number of viewers of a multimedia program. The method includes maintaining a plurality of cached multimedia frames that are portions of the multimedia program. In some embodiments, the plurality of cached multimedia frames are maintained in a circular video buffer that may be maintained on a D-server. A request is received from a client device (e.g., a set-top box (STB)) to receive the multimedia program. In some embodiments the user request includes a request to change a channel. The request may also include a request to record the multimedia program. In response to the request, the method includes providing a portion of cached multimedia frames to the client device. After a period, the client device is directed to a multicast replicator to receive further portions of the multimedia program. An indication that the client device is receiving the further portions of the multimedia program from the multicast replicator is received from the client device. In response, the method includes incrementing a counter that is indicative of the number of viewers receiving the multimedia program. The method may also include receiving an indication that the client device is no longer receiving the multimedia program and decrementing the counter in response. The indication that the client device is no longer receiving the multimedia program may result from a timeout or alternatively, a further request from the client device to receive a second multimedia program.

In another aspect, an STB is disclosed that is enabled to provide to a digital television network an identity of a multimedia program being viewed. In an embodiment, the STB is enabled for receiving a user request to view the multimedia program. The user request to receive the multimedia program may be a request to change a channel. The STB is further enabled for sending to the digital television network an indication of the user request. The STB receives a portion of a plurality of cached multimedia frames that correspond to the multimedia program. Receiving the cached multimedia frames may occur at an accelerated rate compared to a normal play rate. Within a provider network, the plurality of cached multimedia frames may be maintained in a circular buffer in a D-server, for example. In addition, the STB receives an additional portion of the multimedia program from a simulcast replicator. In response, the STB sends the identity of the multimedia program to a viewership statistic server. Sending the identity of the multimedia program to the viewership statistic server may be in response to receiving the further portion of the multimedia program from the simulcast replicator or may be in response to a timeout.

In still another aspect, a computer program product is disclosed that is stored on computer readable media such as some combination of hard drives, random access memory (RAM), random operating memory (ROM), or other memory. The computer program product has instructions for receiving a request to view a multimedia program. Further instructions are for requesting temporary access to the multimedia program from a digital television provider network edge device. Example network edge devices include, without limitation, digital subscriber line (DSL) access multiplexer (DSLAMs) or other network devices located within a central office that may be local to a client device (e.g., STB) operating the computer program product. Further instructions request further access to the multimedia program from a multicast replicator. The multicast replicator, in some embodiments, is referred to as an A-server and the network edge device is referred to as a D-server. In some embodiments, the D-server maintains a circular buffer with cached multimedia frames for a plurality of programs. Further instructions are for sending to a viewership statistic server a time-stamped indication of receiving further access to the multimedia program from the multicast replicator. In the alternative, sending the viewership statistic server the time-stamped indication may occur in response to a viewer remaining parked on a particular channel for a predetermined period. Such systems help reduce network traffic and ignore instances when a viewer is channel surfing. In some embodiments, sending to the viewership statistic server the time-stamped indication is scheduled for an off-peak time. Accordingly, further instructions may be operable for storing the time-stamped indication of receiving further access to the multimedia program and, at a predetermined time, transmitting to the viewership statistic server the time-stamped indication.

Multimedia content such as television programs are often compared using ratings. Ratings are created to measure and classify the popularity of a television program or television channel. The rating of a television program may determine how much is charged for placing advertisements within the television program. Market researchers may judge the effectiveness of an advertisement by knowing the number of viewers that are viewing the advertisement or by knowing the number of viewers that select alternate programming during the advertisement. In addition, television executives may determine which programs are cancelled based on ratings. Ratings may be based on the number of viewers (i.e., viewership) that consume a television program.

Ratings for a television program may be defined using "ratings points". A single ratings point represents 1% of all households in a viewing area (e.g., the United States of America) that have a television. For example, if there are 100,000,000 television-possessing households in a viewing area, a television program having 1 ratings point is estimated to have an average of 1,000,000 viewers at a given moment. "Share" is a ratings metric that represents the percentage of televisions in a viewing area that are powered-on and tuned to a specific program. Television ratings may be reported as ratings points/share. For example, a television program may have a rating of 8.2/10. For a viewing area having 100,000,000 television-possessing households, this rating suggests that an average of 8,200,000 households and 10% of all televisions are tuned to the television program at any given moment.

Disclosed embodiments provide content providers with substantially real time viewership data. In some embodiments, a market researcher may access a web-based front end to receive viewership data as STBs request and view channels. By collecting the data in substantial real time, an accurate and prompt inventory can be collected. Content providers responsible for purchasing television and multimedia content may use the collected information to determine the worth of television programs, movies, and sporting events that the content provider will offer to consumers. Embodied systems do not necessarily rely on collecting statistically significant samples using set meters and do not necessarily require a consumer to complete a viewership log. Instead, viewership data for all or a majority of STBs is automatically and rapidly collected and compiled as multimedia content is provided to the consumers. Embodied systems may include software or firmware that is automatically downloaded from a digital television network to desired STBs, to reduce the need to install expensive separate hardware or other "set meters."

Tracking and trend building of customer viewing habits (i.e., viewership data) is a benefit of disclosed systems. Accumulated data may be sold to advertisers or used by a content provider to negotiate with those who supply syndicated television programs, for example. An additional benefit relates to planning maintenance windows, which may be scheduled during times that relatively low data traffic is expected. Ratings points, shares, and "houses using television" (HUT) calculations can be determined with considerable accuracy. Viewership data related to sporting events or video on demand (VOD) programming may also be tracked. In some embodiments, information regarding whether programming is recorded is collected. In addition, data may be collected regarding whether a consumer fast-forwards through certain multimedia content.

Disclosed embodiments provide ways to monitor the number of users that are watching channels. Reports can be generated regarding, over time, which programs are viewed most frequently. Time stamps may be added to channel change notifications to advise producers regarding when channel changes occur. During the process of changing channels on some IPTV networks, embodied STBs send multicast join requests to edge equipment (e.g., a DSLAM). In operation, such requests are logged to a viewership statistic server (e.g., syslog server or simple network management protocol (SNMP) trap server). The viewership statistic server may then create a "current watching report" that tells in near real time (i.e., substantially in real time) how many viewers are watching a program. Alternatively, a complete data set of viewership data may be offloaded from the viewership statistic server to a centralized server cluster that can compile the data and create a channel trend of most watched times and least watched times. An additional benefit of disclosed embodiments is that viewership data can be used to know when channel changes occur and which portion of programs are watched. Also, viewership data may be used to price advertisement insertion slots.

SNMP may be used in digital television service provider networks to provide channel change information related to client devices (e.g., STBs). An embodied STB may run a channel change agent and report channel change information via SNMP (e.g., SNMP traps) to managing systems (e.g., a viewership data server) upon the STB making a request to join a multicast or receive information from an A-server.

Due to the large number of STBs that may operate within a digital television provider network, it may be beneficial for STBs to send viewership data without being asked by managing systems. For example, disclosed STBs may send an SNMP TRAP or INFORM operation. Examples that mention TRAP and such operations are meant as illustrative and not meant to restrict the claimed subject matter. Some versions of SNMP label TRAP statements as NOTIFICATION. Other similar operations and protocols may be used. In addition, if a managing system wishes to poll all or a portion of STBs serviced by a digital television provider network the managing system may retrieve viewership data by issuing SNMP GET, GETNEXT or GETBULK operations, as examples. Viewership data may be sent continuously (i.e., immediately after each channel change or each simulcast request) or may be sent at regular intervals. To stagger traffic received by a viewership statistic server, messages from multiple STBs may be synchronously related or timed. Alternatively, traffic sent to the viewership statistic server may be scheduled for off-peak viewing periods, for example at 3:00 am. Still further, the viewership statistic server may periodically send a command, in response to an adminstrator request for example, to all or a portion of STBs in a service area to determine what viewers are watching.

In some digital television networks, at least two types of servers are used to provide content to STBs. Specifically, A-servers and D-servers are used. In some digital television networks the number of A-servers scale with channels and D-servers scale with subscribers. Moreover, there may be more D-servers than A-servers. Use of two server types assists in reducing latencies involved with channel changes. D-servers, in some disclosed systems, sit at the edge of a provider network and cache image frames of multimedia programs. For example, D-servers may be in a central office or DSLAM. Upon a channel change by a user, the D-server provides frames to the STB from a cache. In some embodiments, the frames are provided at an accelerated feed rate (e.g., 1.3× a normal rate) to assist the STB in preventing underflow problems. After a timeout or other trigger condition, an STB may request to join a simulcast from an A-server. In some disclosed embodiments, upon this request, the STB sends an SNMP TRAP statement to a viewership statistic server with the identity of the channel requested or the identity of the program requested. Preferably, the STB receives a seamless transfer from the D-server to the A-server simulcast.

In the following description, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, element "121-1" refers to an instance of an STB, which may be referred to collectively as STBs "121" and any one of which may be referred to generically as an STB "121."

Before describing other details of embodied methods and devices, selected aspects of service provider networks that provide multimedia programs are described to provide further context.

Television programs, VOD movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein as "channels"), each occupying a different frequency band or channel, through a coaxial cable, a fiber-optic cable, or a combination of the two. The bandwidth required to transport simultaneously large numbers of multimedia channels may challenge cable-based providers. In these types of networks, a tuner within an STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies. Instead of being associated with a particular frequency band, an IPTV television program, movie, or other form of multimedia content is a packet-based stream that corresponds to a particular network address, e.g., an IP address. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an IP or analogous type of network address that is associated with the desired channel.

IPTV may be implemented, at least in part, over existing infrastructure including, for example, a proprietary network that may include existing telephone lines, possibly in combination with customer premise equipment (CPE) including, for example, a DSL modem in communication with a STB, a display, and other appropriate equipment to receive multimedia content from a provider network and convert such content into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information (e.g., sophisticated and customizable electronic program guides (EPGs)), and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 for performing channel trending in accordance with disclosed embodiments. MCDN 100, as shown, is a digital television network (i.e., a provider network) that may be generally divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSLAM may be used within access network 130 to transfer signals containing multimedia content from optical fiber to copper wire for DSL delivery to consumers.

In accordance with disclosed embodiments, access network 130 may include a D-server (not depicted) or other server-side device that buffers portions of requested multimedia program to help reduce latencies associated with channel changes. After a request by STB 121-2 to receive a multimedia program, the D-server provides cached multimedia frames from the multimedia program to STB 121-1. In accordance with disclosed embodiments, the D-server may provide 6 to 15 seconds, for example, of video before a seamless transfer to another server-side simulcast or multicast replicator. For examples, a seamless transfer may occur between the D-server (not depicted) and content delivery server 155. In some embodiments, the D-server (not depicted) is an edge device in access network 130 and content deliver server 155 provides further portions of the multimedia program to one or more STBs including 121-2. Upon the hand-off from the D-server to content delivery server 155, STB 121-2 sends an indication (e.g., an SNMP TRAP statement) to viewership statistic server 289 which increments a counter to indicate another STB is viewing the multimedia program. In this way, MCDN may be used to provide channel trending regarding the number of viewers for multimedia programs.

Access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by subscribers served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the World Wide Web icons 111.

As shown in FIG. 1, the client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

As shown in FIG. 1, RG 122 may include elements of a broadband modem such as a DSL modem, as well as elements of a router and/or access point for an Ethernet or other suitable local area network (LAN) 123. In this embodiment, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using an infrared (IR) or RF signal. STB 121-1 and STB 121-2, as shown, may communicate through LAN 123 in accordance with disclosed embodiments to select multimedia programs for viewing.

In IPTV compliant implementations of MCDN 100, the clients 120 are operable to receive packet-based multimedia streams from access network 130 and process the streams for presentation on displays 124. In addition, clients 120 are network-aware systems that may facilitate bidirectional-networked communications with server side 102 resources to facilitate network hosted services and features. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol/internet protocol (UDP/IP) as well as web protocols such as hypertext transport protocol (HTTP) over transport control protocol (TCP/IP).

The server side 102 of MCDN 100 as depicted in FIG. 1 emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Prior to transmission, live acquisition server 140 may encode acquired content using, e.g., MPEG-2, H.263, a Windows Media Video (WMV) family codec, or another suitable video codec. Acquired content may be encoded and composed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary and/or optional.

Content delivery resources 107 as shown in FIG. 1 are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver (e.g., STB 121 of client 120), where the content is parsed from individual packets and re-assembled into multimedia content suitable for processing by a STB decoder.

User requests received by content delivery server 155 may include an indication of the content that is being requested. In some embodiments, this indication includes an IP address associated with the desired content. For example, a particular local broadcast television station may be associated with a particular channel and the feed for that channel may be associated with a particular IP address. Alternatively, in accordance with some disclosed embodiments, a particular art gallery may be associated with a particular channel and the feed for that channel may be associated with a particular IP address. When a subscriber wishes to view the station or art gallery, the subscriber may interact with remote control device 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request by making a streaming video signal accessible to the user. In the case of multicast, content delivery server 155 employs a multicast protocol to deliver a single originating stream to multiple clients. When a new user requests the content associated with a multicast stream, there may be latency associated with updating the multicast information to reflect the new user as a part of the multicast group. To avoid exposing this undesirable latency to the subscriber, content delivery server 155 may temporarily unicast a stream to the requesting subscriber. When the subscriber is ultimately enrolled in the multicast group, the unicast stream is terminated and the subscriber receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future IP for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets, for example. Client-facing switch 113 as shown is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more user applications 165 that may be made available to system subscribers. For example, user applications 165 as shown include an EPG application 163. User applications 165 may include other applications as well. In addition to user applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. User application 164 is illustrated in FIG. 1 to emphasize the ability to extend the network's capabilities by implementing a network-hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, an SNMP.

Figure 2:
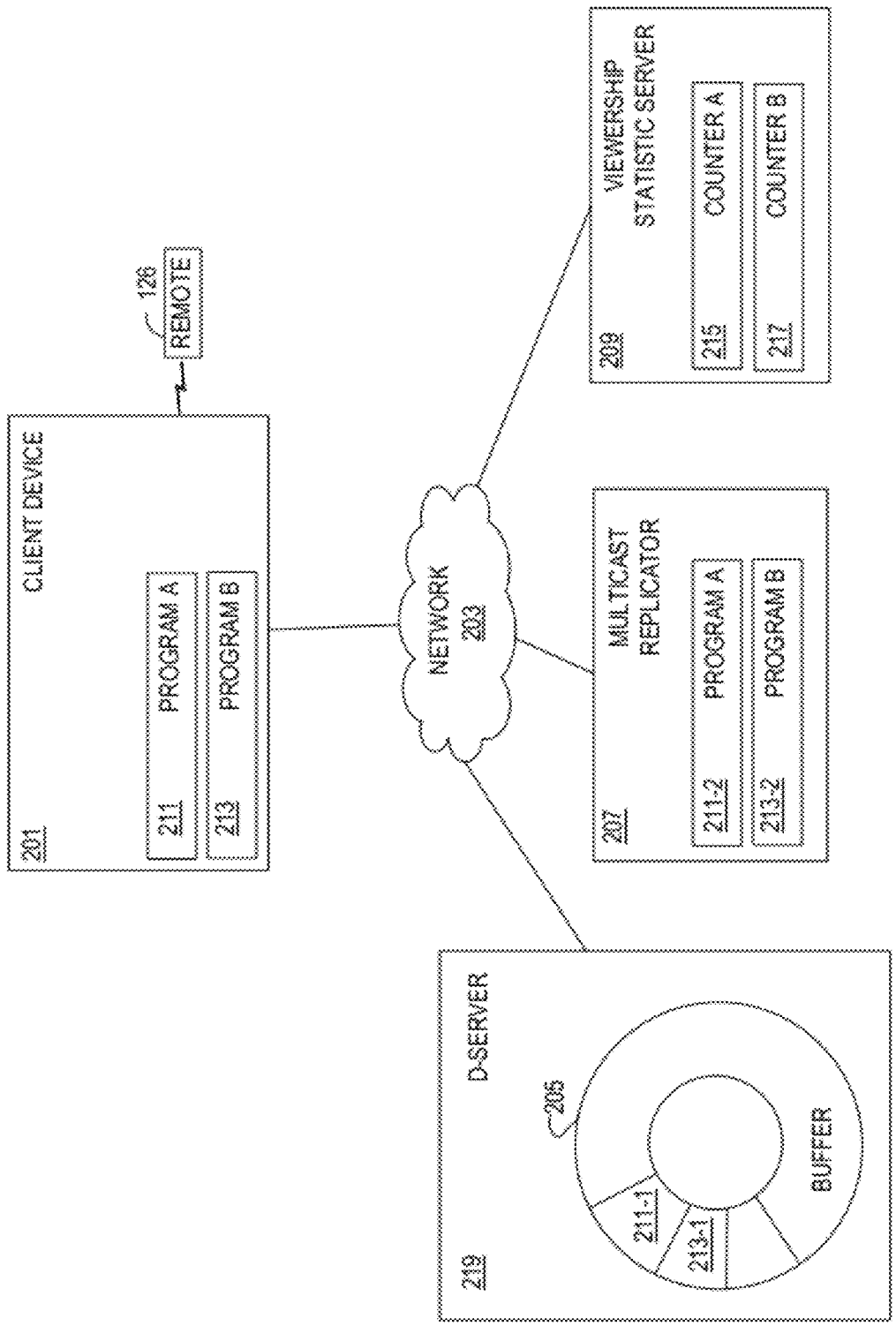
FIG. 2 illustrates additional aspects of an example architecture for performing digital television channel trending in accordance with disclosed embodiments.

FIG. 2 depicts selected elements of an example architecture for channel trending in accordance with disclosed embodiments. As shown, client device 201 (e.g., STB 121 from FIG. 1) is enabled to provide an identity of a multimedia program (e.g., program 211) being viewed to viewership statistic server 209, which is part of or communicatively coupled to a digital television provider network (e.g., MCDN 100 in FIG. 1). As shown, client device 201 is enabled for receiving a user request from remote control device 126 to view a multimedia program (e.g., program 213). The user request may be generated from a user navigating an EPG on a display, for example. In response to the user request to view a multimedia program, client device 201 sends through network 203 an indication of the user request to D-server 219, which may reside in a DSLAM (not depicted) or central office in a geographic area local to client device 201. As shown, D-server 219 maintains a circular buffer 205 that maintains a plurality of cached multimedia frames 213-1 that are a portion of program 213. In addition, as shown, circular buffer 205 maintains a plurality of cached multimedia frames 211-1 that are a portion of program 211. In response to the request, D-server 219 sends through network 203 a portion 213-1 of program 213. In some embodiments, to help prevent underflow in client device 201, D-server 219 sends a plurality of cached multimedia frames at an accelerated rate compared to a normal play rate. For example, if client device 201 plays video at a speed of R, D-server 219 may send portions of a multimedia program at a rate 1.5*R to help prevent client device 201 from running out of video to play in the event of a delay communicating through network 203. After a timeout or in response to a trigger event, for example, client device 201 receives a further portion of program 213 from a multicast replicator 207, which stores or accesses program 211-2 and 213-2, which are further portions of programs 211 and 213. In response to, in conjunction with, or in parallel to joining a simulcast or multicast from multicast replicator 207, client device 201 sends the time-stamped identity of program 213 to viewership statistic server 209, which increments counter 217. If client device 201 changes channels to request program 211, D-server 219 sends cached multimedia frames 211-1 to client device 201. In some embodiments, D-server 219 maintains approximately between 6 and 15 seconds of program 211 in circular buffer 205. Around the time of a seamless transfer (i.e., handoff) from D-server 219 providing portions of program 211 (i.e., program 211-1) to multicast replicator 207 providing portions of program 211 (i.e., program 211-2), client device 201 sends an SNMP TRAP statement, for example, to viewership statistic server 209 to result in decrementing counter 217 and incrementing counter 215.

Figure 3:
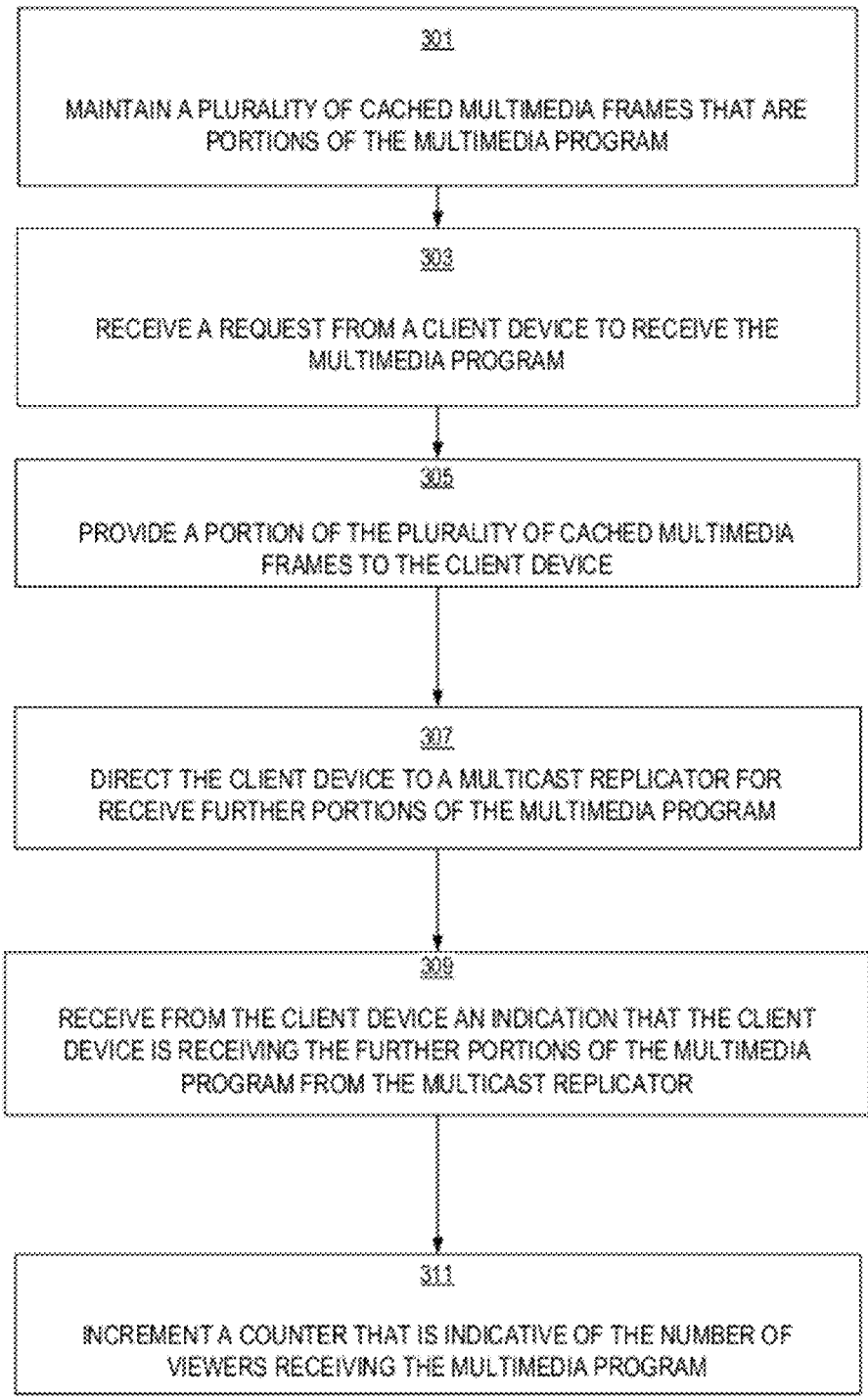
FIG. 3 illustrates a methodology for performing digital television channel trending in accordance with disclosed embodiments.

FIG. 3 illustrates selected operations for channel trending in accordance with disclosed embodiments. As shown, operation 301 relates to maintaining a plurality of cached multimedia frames that are portions of the multimedia program. In some embodiments, the plurality of cached multimedia frames are maintained in a circular video buffer that may be maintained on a D-server. As shown in operation 303, a request is received from a client device (e.g., an STB) to receive the multimedia program. In some embodiments the user request includes a request to change a channel. The request may also include a request to record the multimedia program. In response to the request, operation 305 includes providing a portion of cached multimedia frames to the client device. After a period or in response to a triggering event, operation 307 provides for directing the client device to a multicast replicator to receive further portions of the multimedia program. In operation 309, an indication that the client device is receiving the further portions of the multimedia program from the multicast replicator is received from the client device. In operation 311, a counter is incremented that is indicative of the number of viewers receiving the multimedia program. The method may also include receiving an indication that the client device is no longer receiving the multimedia program and decrementing the counter in response. The indication that the client device is no longer receiving the multimedia program may result from a timeout or alternatively, a further request from the client device to receive a second multimedia program. In one aspect, a disclosed method tracks a number of viewers of a multimedia program.

Figure 4:
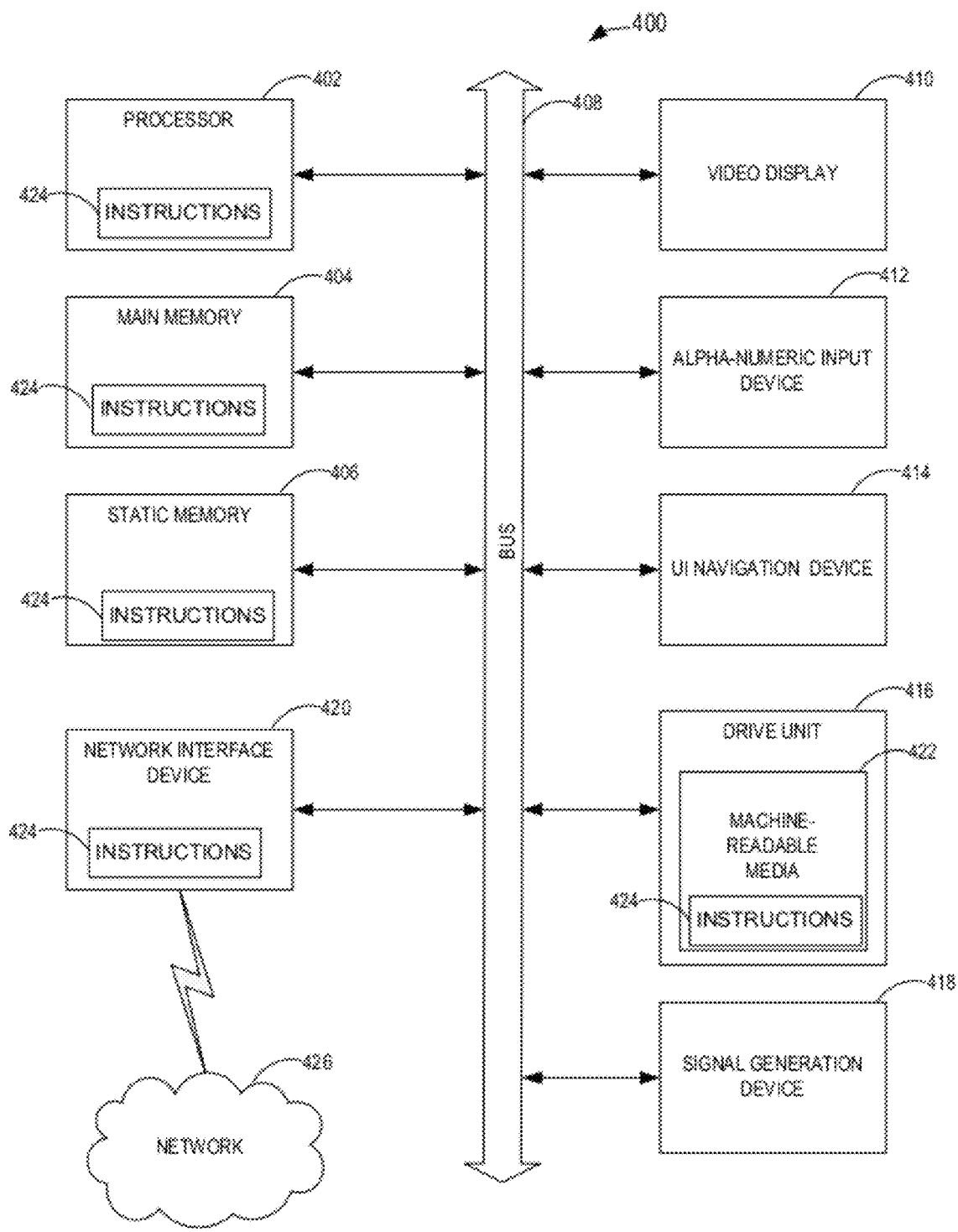
FIG. 4 illustrates a data processing system for use with disclosed embodiments to perform digital television channel trending.

FIG. 4 illustrates in block diagram form a data processing system 400 within which a set of instructions may operate to perform one or more of the methodologies discussed herein. Data processing system 400 may operate as a standalone device or may be connected (e.g., networked) to other data processing systems. In a networked deployment, data processing system 400 may operate in the capacity of a server or a client data processing system in a server-client network environment, or as a peer computer in a peer-to-peer (or distributed) network environment. Example data processing systems include, but are not limited to a digital video recorder, a personal computer (PC), a tablet PC, STB, a cable box, a satellite box, an EPG box, a personal data assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown, data processing system 400 includes a processor 402 (e.g., a central processing unit, a graphics processing unit, or both), a main memory 404, and a static memory 406 that may communicate with each other via a bus 408. In some embodiments, the main memory 404 and/or the static memory 406 may be used to store the indicators or values that relate to multimedia content accessed or requested by a consumer. Data processing system 400 may further include a video display unit 410 (e.g., a television, a liquid crystal display or a cathode ray tube) on which to display multimedia content such as pay-per-view sporting events, television programs, VOD movies, and the like. Data processing system 400 also includes an alphanumeric input device 412 (e.g., a keyboard or a remote control), a user interface (UI) navigation device 414 (e.g., a remote control or a mouse), a disk drive unit 416, a signal generation device 418 (e.g., a speaker) and a network interface device 420. The input device 412 and/or the UI navigation device 414 (e.g., the remote control) may include a processor (not shown), and a memory (not shown). The disk drive unit 416 includes a machine-readable medium 422 that may have stored thereon one or more sets of instructions and data structures (e.g., instructions 424) embodying or utilized by any one or more of the methodologies or functions described herein. The instructions 424 may also reside, completely or at least partially, within the main memory 404, within static memory 406, within network interface device 420, and/or within the processor 402 during execution thereof by the data processing system 400.

The instructions 424 may further be transmitted or received over a network 426 (e.g., a content provider) via the network interface device 420 utilizing any one of a number of transfer protocols (e.g., broadcast transmissions, HTTP). While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine (i.e., data processing system) and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims. For example, the term "set-top box" or "STB" may be used to describe functionality that may be integrated into a television, RG, or other receiver.

What is claimed is:

1. A method, comprising:
responsive to receiving a multicast join request corresponding to a user request for a multimedia program, sending a first portion of the multimedia program from a cache of multimedia frames of a network edge device to a client device;
directing the client device to a multicast replicator for receiving a second portion of the multimedia program;
responsive to receiving the second portion of the multimedia program from the multicast replicator, incrementing a multicast request counter indicative of a number of viewers receiving the multimedia program; and
scheduling to send an indication of the multicast request counter to a server during an off-peak time.

2. The method of claim 1, wherein the cache of multimedia frames is maintained in a circular video buffer.

3. The method of claim 1, wherein the user request includes a request to change a channel.

4. The method of claim 3, wherein the multimedia frames are from a live video feed.

5. The method of claim 1, wherein the user request includes a request to record the multimedia program.

6. The method of claim 5, wherein the user request includes a request to record the multimedia program during a future transmission of the multimedia program, wherein the incrementing of the multicast request counter is scheduled to occur when the client device receives the second portion of the multimedia program during the future transmission of the multimedia program.

7. The method of claim 1, wherein the first portion of the multimedia program is sent from the cache of multimedia frames of a network edge device to the client device at a rate greater than a multimedia frame rate for the multimedia program.

8. The method of claim 1, further comprising:
responsive to receiving an indication that the client device is no longer receiving the multimedia program, decrementing the multicast request counter.

9. The method of claim 8, wherein receiving the indication that the client device is no longer receiving the multimedia program includes detecting a timeout for receiving communications from the client device.

10. The method of claim 8, wherein receiving the indication that the client device is no longer receiving the multimedia program includes receiving a further request from the client device to receive a second multimedia program.

11. The method of claim 10, further comprising:
incrementing a second counter indicative of a number of viewers receiving the second multimedia program.

12. The method of claim 11, further comprising:
receiving from the multicast replicator an indication that the client device is receiving the second multimedia program.

13. A set-top box, comprising:
a processor;
a non-transitory computer readable medium, accessible to the processor, including
processor executable instructions that, when executed by the processor, cause the processor to perform operations comprising:
responsive to receiving a user request to view a multimedia program, sending a multicast join request to a digital television network;
receiving, from a D-server cache, cached multimedia frames comprising a first portion of the multimedia program;
directing a client device to a simulcast replicator for receiving a second portion of the multimedia program;
receiving the second portion of the multimedia program from the simulcast replicator;
incrementing a multicast request counter indicative of a number of viewers receiving the multimedia program; and
responsive to joining a multicast of the multimedia program,
scheduling to send an identity of the multimedia program to a server during an off-peak time.

14. The set-top box of claim 13, wherein sending the identity of the multimedia program occurs after receiving the second portion of the multimedia program.

15. The set-top box of claim 13, wherein sending the identity of the multimedia program occurs after a timeout.

16. The set-top box of claim 13, wherein the user request is associated with a channel change request.

17. A non-transitory tangible computer readable medium including stored, processor executable instructions that, when executed by a processor, cause the processor to perform operations comprising:
sending a multicast join request for a multimedia program to a digital television network;
requesting access to a first portion of the multimedia program stored in a cache of a network edge device of the digital television network;
directing a client device to a multicast replicator for receiving a second portion of the multimedia program;
requesting access to the second portion of the multimedia program from the multicast replicator;
sending to a server during an off-peak time a time-stamped indication of sending the multicast join request;

responsive to receiving the second portion of the multimedia program from the multicast replicator, incrementing a multicast request counter indicative of a number of viewers receiving the multimedia program; and scheduling to send an identity of the multimedia program to a server during an off-peak time.

18. The non-transitory computer readable medium of claim 17, wherein the operations include:
storing the time-stamped indication.

19. The non-transitory computer readable medium of claim 18, wherein the operations include:
receiving the first portion of the multimedia program at a rate greater than a normal play rate for the multimedia program.

20. The non-transitory computer readable medium of claim 18, wherein the operations include:
receiving at least some of the second portion of the multimedia program during playback of the first portion of the multimedia program.

* * * * *